(12) United States Patent
Koyama et al.

(10) Patent No.: US 7,050,243 B2
(45) Date of Patent: May 23, 2006

(54) LENS APPARATUS, CAMERA SYSTEM, AND CAMERA

(75) Inventors: Atsushi Koyama, Utsunomiya (JP); Masahisa Tamura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 11/042,575

(22) Filed: Jan. 24, 2005

(65) Prior Publication Data

US 2005/0168836 A1 Aug. 4, 2005

(30) Foreign Application Priority Data

Jan. 30, 2004 (JP) .............................. 2004-024931

(51) Int. Cl.
*G02B 15/14* (2006.01)

(52) U.S. Cl. ........................ 359/694; 359/699; 359/701

(58) Field of Classification Search ................ 359/699, 359/694, 700–704, 822, 823, 819, 825
See application file for complete search history.

(56) References Cited

U.S. PATENT DOCUMENTS

| | | | | |
|---|---|---|---|---|
| 5,037,187 A | * | 8/1991 | Oda et al. | 359/699 |
| 5,485,315 A | * | 1/1996 | Nomura et al. | 359/701 |
| 5,870,232 A | * | 2/1999 | Tsuji et al. | 359/700 |

FOREIGN PATENT DOCUMENTS

JP H06-174997 6/1994

* cited by examiner

*Primary Examiner*—Ricky L. Mack
*Assistant Examiner*—M. Hasan
(74) *Attorney, Agent, or Firm*—Cowan, Liebowitz & Latman, P.C.

(57) ABSTRACT

Provided is a lens apparatus having a first holding member that holds a first lens unit and a second holding member that holds the first holding member, in which the first and second holding members are engaged with each other so as to be capable of relative movement by means of a plurality of engagement portions provided circumferentially at unequal intervals including a first interval and a second interval larger than the first interval, and in which there is provided, in a portion between the engagement portions arranged at the second interval in at least one of the first and second holding members, an abutment portion radially abutting the other holding member.

7 Claims, 6 Drawing Sheets

LENS APPARATUS, CAMERA SYSTEM, AND CAMERA

BACKGROUND OF THE INVENTION

1. Field of the Invention

The present invention relates to a lens barrel equipped with a lens holding frame with circumferentially arranged cams. The present invention also relates to a camera system and a camera.

2. Related Background Art

Recently, the automatic focusing system has come into general use in interchangeable lens systems for single-lens reflex cameras, and apparatuses having a lens driving actuator inside the lens barrel thereof are becoming increasingly common.

As a result of the recent demand for portability, single-lens reflex cameras have been substantially reduced in size, and a further reduction in the size of the lens barrel is required even in the case in which the lens barrel contains the lens driving actuator. Further, along with the further reduction in size, there is a demand for a further increase in power in the case of a zoom lens.

A conventional lens barrel will be briefly described with reference to FIG. 6, which is a sectional view. In the case of this lens barrel, a lens driving actuator 30 is arranged in the outer periphery of a cam barrel 31 for causing a lens holding frame to advance or retreat along an optical axis direction of the lens. In some cases, however, not limited to the example described above, the lens driving actuator 30 is arranged in the vicinity of the rear end of the cam barrel 31 with respect to the optical axis direction. An example of such conventional lens barrels is disclosed in Japanese Patent Application Laid-Open No. H06-174997.

In such conventional examples as described above, however, there is a fear of the maximum lens diameter or the total barrel length becoming rather large.

Recently, the digitization of single-lens reflex cameras has also progressed, and there is a demand for a further improvement in optical performance so that a user of the camera can easily obtain an enlarged photographic image by using a personal computer or the like. The improvement in optical performance involves enhanced optical sensitivity, so that there is also a need for an improvement in terms of accuracy with respect to offset and inclination due to play in the lens holding frame in the lens barrel.

SUMMARY OF THE INVENTION

It is an object of the present invention to provide a lens barrel which helps to obtain desired optical performances and which contains a lens driving actuator while achieving a reduction in size.

A lens apparatus according to the present invention includes a first holding member that holds a first lens unit and a second holding member that holds the first holding member, in which the first and second holding members are engaged with each other so as to be capable of relative movement by means of a plurality of engagement portions arranged circumferentially at unequal intervals including a first interval and a second interval larger than the first interval, and in which there is provided, in a portion between the engagement portions arranged at the second interval in at least one of the first and second holding members, an abutment portion radially abutting the other holding member.

The features of the present invention will become apparent from the following specific description of an embodiment given with reference to the accompanying drawings.

DESCRIPTION OF THE PREFERRED EMBODIMENTS

An embodiment of the present invention will now be described.

Figure 1:
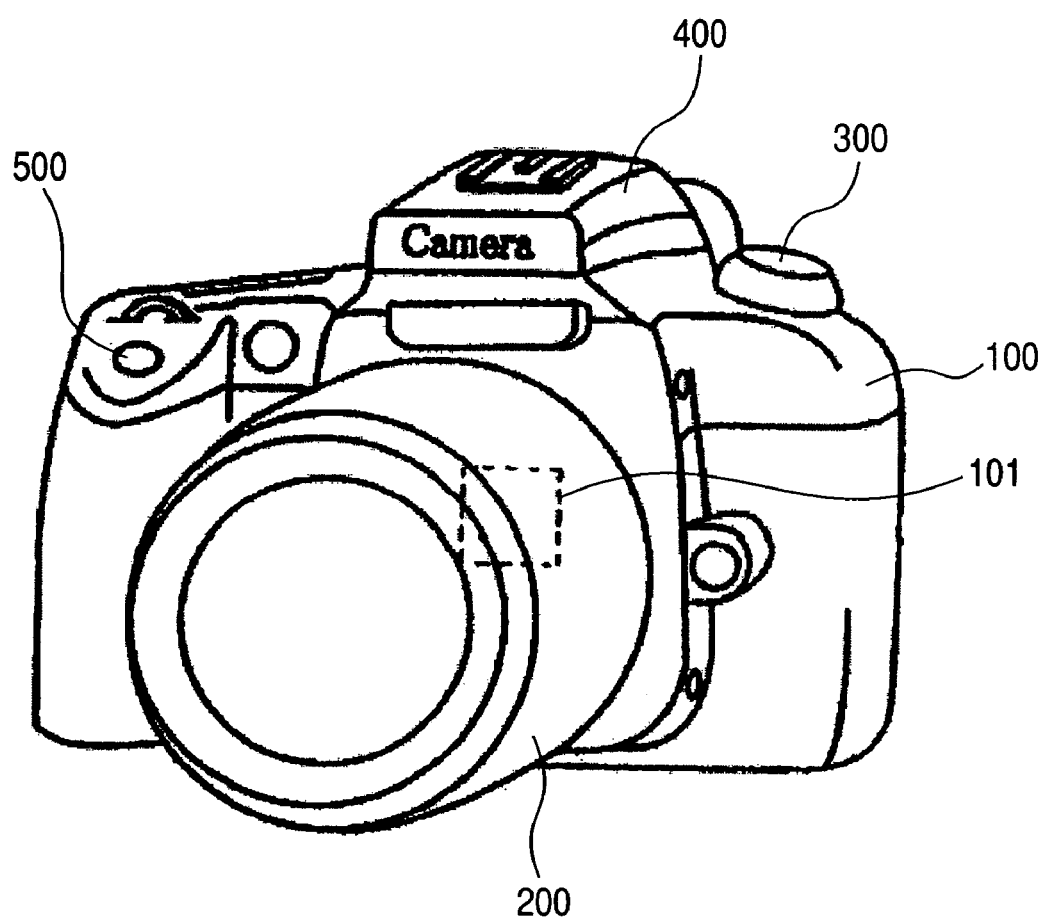
FIG. 1 is a front perspective view of a camera system according to an embodiment of the present invention.

First, a camera system according to this embodiment will be schematically described with reference to FIG. 1, which is a front view of the camera system.

Reference numeral 100 indicates a camera main body, which is equipped with an imaging device 101 (e.g., a CCD or a CMOS sensor) which effects photoelectric conversion on an image of an object.

Provided on the front surface of the camera main body 100 is a mount 1 described below, to which a lens barrel 200 capable of zooming is detachably attached.

On the right-hand side portion of the camera main body 100 as seen in the drawing, there is provided a dial-type photographic mode dial 300 for determining a photographic mode. On the left-hand side of the photographic mode dial 300, there is provided a stroboscopic light emitting device 400. On the left-hand side of the stroboscopic light emitting device 400, there is provided a release button 500.

The stroboscopic light emitting device 400 can be opened and closed with respect to the camera main body 100, and is driven in the opening direction at the time of photographing, applying stroboscopic light to the object to be photographed.

The release button 500 is constructed of a two-stage operating switch. Upon a first stroke operation, it starts preparatory photographic operations (such as focus detecting operation and photometric operation), and upon a second stroke operation, it starts photographing operations (exposure of an imaging device 101 and recording of an image signal output from the imaging device 101 on a recording medium). A further description of the camera main body 100 will be omitted.

Figure 2:
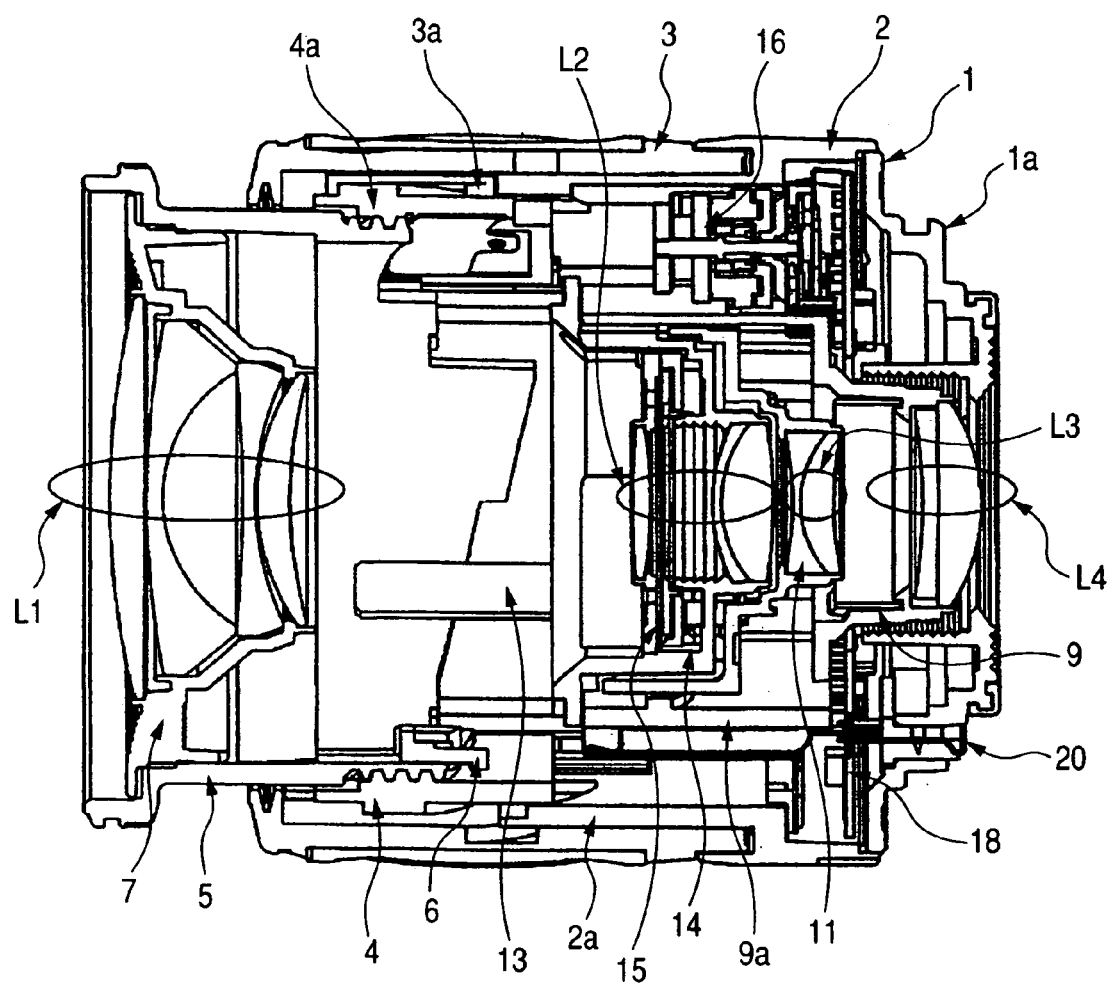
FIG. 2 is a longitudinal sectional view of a lens barrel to be mounted to a camera main body.
Figure 3:
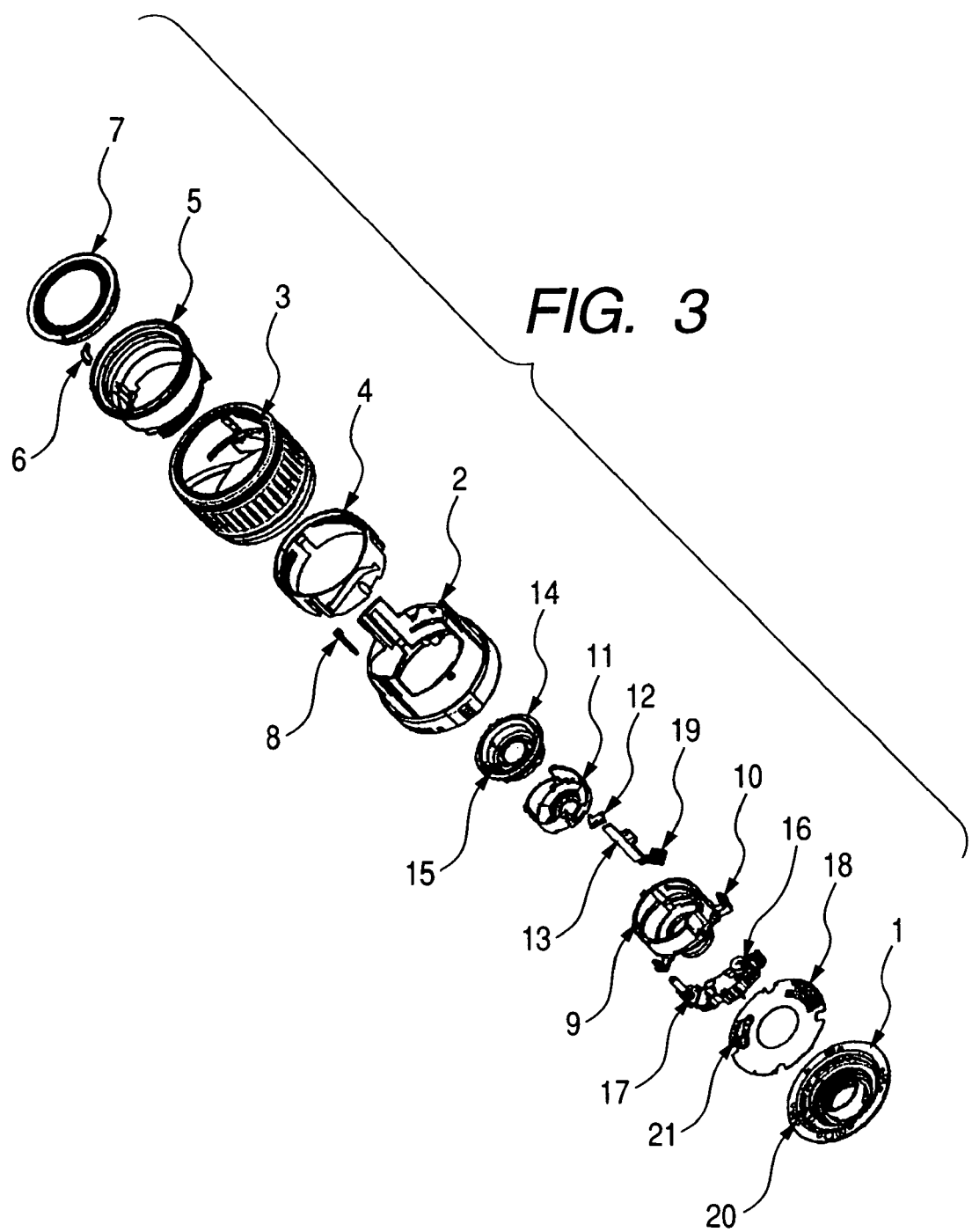
FIG. 3 is an exploded perspective view of a lens barrel.
Figure 4:
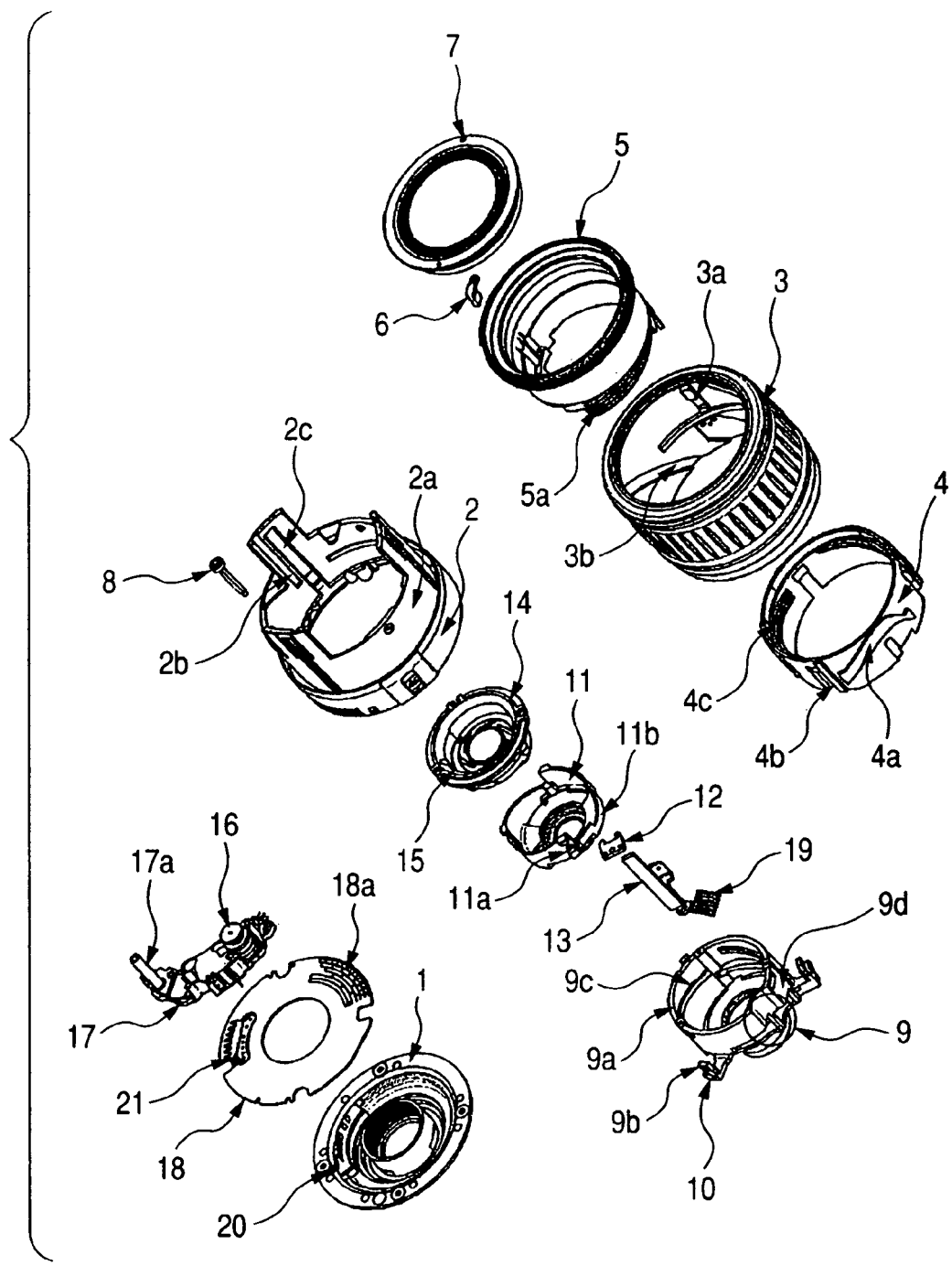
FIG. 4 is an enlarged view of FIG. 3, which is the exploded perspective view of the lens barrel.

Next, the lens barrel 200 of this embodiment will be described with reference to FIGS. 2 through 4. FIG. 2 is a sectional view, taken along the optical axis direction, of the lens barrel at the time of wide-angle shot. FIG. 3 is an exploded perspective view of the lens barrel 200 of FIG. 1. FIG. 4 is an enlarged view of components of the lens barrel 200.

In these drawings, reference numeral 1 indicates a mount, which has a claw portion 1a for connection with the camera main body 100.

A zoom operation ring 3 is engaged with the outer periphery of an inner cylindrical portion 2a of a stationary cylinder 2 so as to be incapable of advancing or retreating in the optical axis direction and capable of rotating around the optical axis.

In the outer periphery of a female helicoid ring 4, there are provided circumferentially, at three positions and at equal intervals, protruding cams 4a to be engaged with a cam follower 3a provided in the inner periphery of the zoom operation ring 3, and protrusions 4b to be engaged with a rotation preventing groove 2b provided in the inner periphery of the inner cylindrical portion 2a of the stationary cylinder 2.

Reference Numeral 5 indicates a filter frame, which is equipped with a male helicoid 5a to be engaged with a female helicoid 4c provided in the inner periphery of the female helicoid ring 4.

Reference numeral 6 indicates a stopper member, which is fixed to the filter frame 5 by a screw (not shown) after the engagement of the filter frame 5 with the female helicoid ring 4, restricting the rotation angle of the filter frame 5.

Reference numeral 7 indicates a first lens holding frame holding a first lens unit L1, which is fastened to the filter frame 5 by a screw, and then fixed by adhesive.

Reference numeral 8 indicates a focusing gear retained in the inner periphery of the female helicoid ring 4, which is in mesh with a gear portion (not shown) provided in the outer periphery of the filter frame 5.

Reference numeral 9 indicates a fourth lens holding frame holding a fourth lens unit L4, which has a cylindrical portion 9a extending in the optical axis direction, and has, at three positions and at equal intervals in its outer periphery, radially extending rectilinear guide portions 9b.

The rectilinear guide portions 9b are engaged with rectilinear guide groove portions 2c provided at three positions and at equal intervals in the inner cylindrical portion 2a of the stationary cylinder 2, and runners 10 rotatably fixed to the forward ends of the rectilinear guide portions 9b by screws with shafts are engaged with lead groove portions 3b provided at three position and at equal intervals in the inner peripheral surface of the zoom operation ring 3.

Reference numeral 11 indicates a third lens holding frame holding a third lens unit L3, which has in its outer periphery cam followers 11a (engagement portions), and are engaged with protruding cams 9c provided in the inner periphery of the cylindrical portion 9a of the fourth lens holding frame 9.

The protruding cams 9c are provided at three positions and at unequal angular intervals. In the portion having the maximum angle and no protruding cam 9c, there is formed a recess 9d (abutment portion) recessed toward the optical axis.

Figure 5:
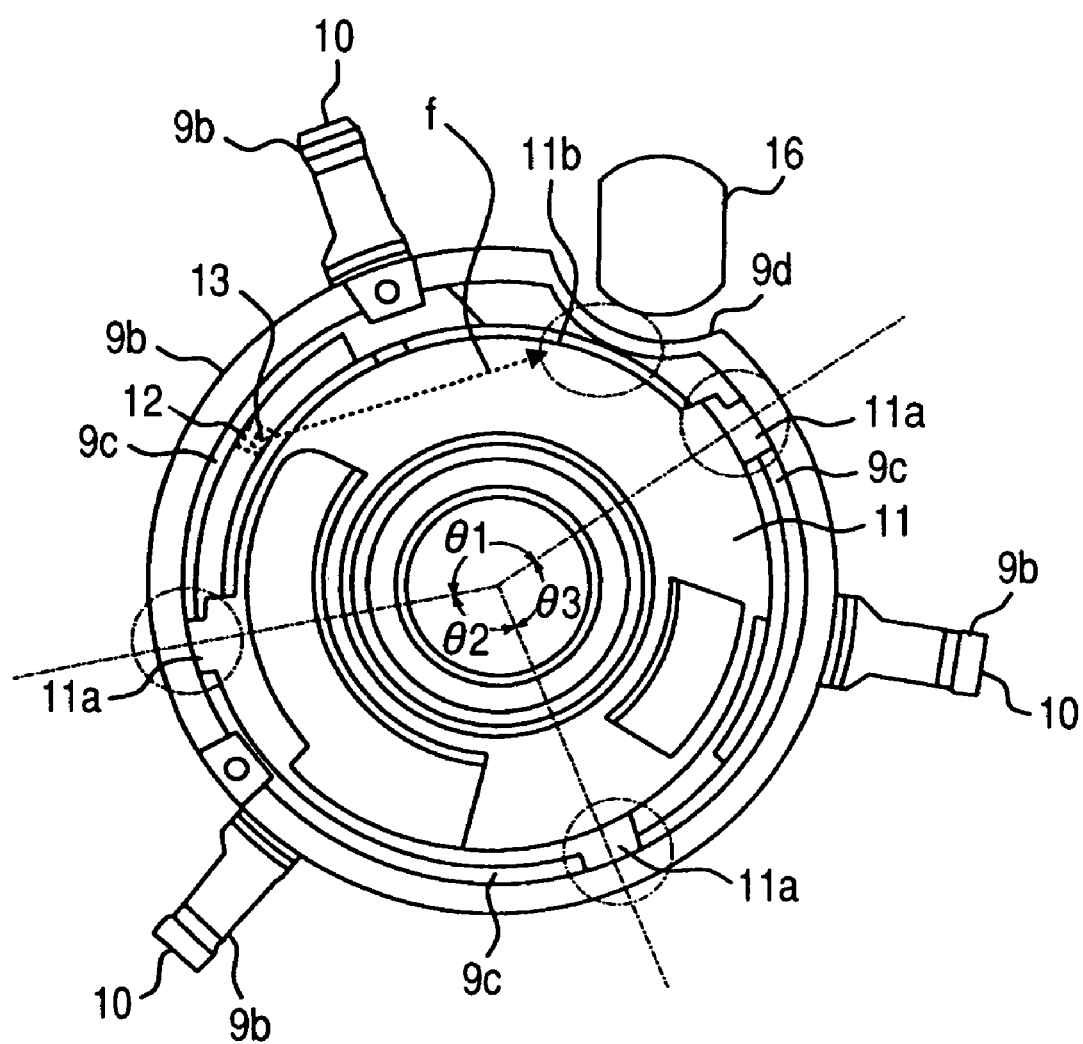
FIG. 5 is a view, as seen in the optical axis direction, showing how a third lens holding frame and a fourth lens holding frame are engaged with each other.
Figure 6:
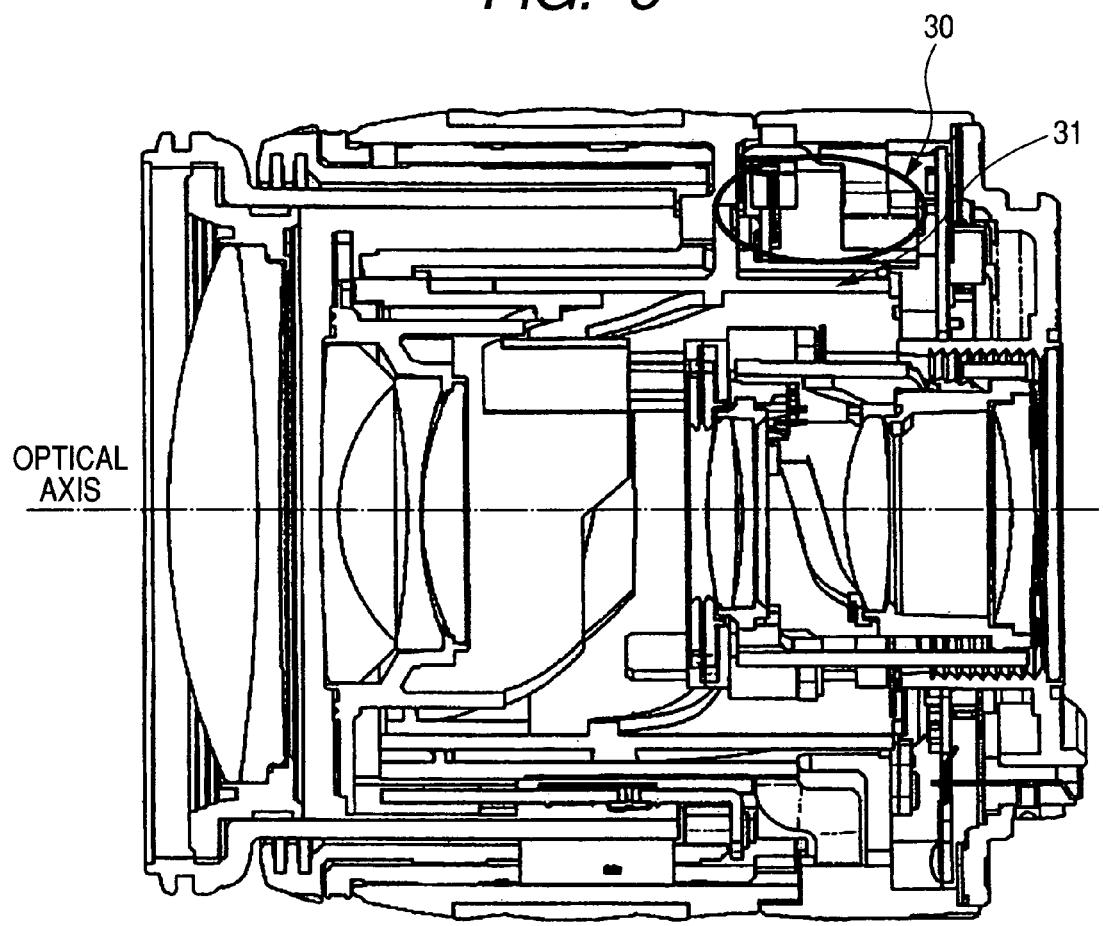
FIG. 6 is a longitudinal sectional view of a conventional interchangeable lens barrel.

Here, the recess 9d formed in the fourth lens holding frame 9 will be described in detail with reference to FIG. 5. FIG. 5 is a view as seen in the optical axis direction, showing how the fourth lens holding frame 9 and the third lens holding frame 11 are engaged with each other.

The third lens holding frame 11 is divided into three areas by dashed lines extending radially from the optical axis toward the portions where the cam followers 11a of the third lens holding frame 11 and the protruding cams 9c of the fourth lens holding frame 9 are engaged with each other (the areas enclosed by circles in FIG. 4). The respective intervals between the engagement portions correspond to angles θ1 to θ3, the angle θ1 being set larger than the angles θ2 and θ3.

As shown in the drawing, the recess 9d of the fourth lens holding frame 9 is formed in the area corresponding to the angle θ1, which is the largest of the angles θ1 to θ3, and is in contact with the outer peripheral surface 11b of the third lens holding frame 11.

It goes without saying that the cam followers 11a are also provided at three positions and at unequal angular intervals.

While in this embodiment the recess 9d formed in the fourth lens holding frame 9 is held in contact with the outer peripheral surface 11b of the third lens holding frame 11, it is also possible, for example, to form a protrusion protruding away from the optical axis on the third lens holding frame 11, thus engaging this protrusion with the inner peripheral surface of the fourth lens holding frame 9.

That is, of the areas between the engagement portions, the area corresponding to the largest angle θ1 may be provided with the portion where the third lens holding frame 11 and the fourth lens holding frame 9 are held in contact with each other.

Further, on the contrary, it is also possible to form cams on the outer peripheral surface of the third lens holding frame 11 and to provide protruding cams protruding toward the optical axis on the inner peripheral surface of the fourth lens holding frame 9.

Referring back to FIG. 4, the description of the lens barrel 200 will be continued. Reference numeral 12 indicates a rotation transmitting engagement member, which is fixed to the back surface of the third lens holding frame 11 by means of a screw (not shown) after mounting the third lens holding frame 11 to the fourth lens holding frame 9.

Reference numeral 13 indicates a rotation transmitting member, one end of which is fixed to the inner periphery of the zoom operation ring 3, and the other end of which is engaged with the rotation transmitting engagement member 12. Reference numeral 14 indicates a second lens holding frame holding a part of a second lens unit L2, which is fixed to the front end surface of the cylindrical portion 9a of the fourth lens holding frame 9 by means of a screw (not shown).

Reference numeral 15 indicates an electromagnetic diaphragm unit holding a part of the second lens unit L2, which is fixed to the second lens holding frame 14 by means of a screw. Reference numeral 16 indicates a vibration type motor, which is arranged in the recess 9d provided in the cylindrical portion 9a of the fourth lens holding frame 9. This embodiment employs a so-called bar-like vibration type motor which provides a rotation output through composition of flexing vibrations of two vibrators. This, however, should not be construed restrictively.

Reference numeral 17 indicates an automatic focusing gear unit, which has an output shaft 17a engaged with a focusing gear 8, transmitting the output of the vibration type motor 16 to the filter frame 5 through a row of gears.

Reference numeral 18 indicates an electric component mounting board, which is electrically connected to the electromagnetic diaphragm unit 15, the vibration type motor 16, etc. through a flexible printed circuit board (not shown) or the like.

Reference numeral 19 indicates a zoom brush, which is fixed to the rotation transmitting member 13 by means of a screw (not shown), which slides on a code pattern 18a provided on the electric component mounting board 18 to issue a predetermined electric signal, thereby detecting a rotation angle.

Reference numeral 20 indicates a contact terminal, which is fixed to the mount 1 by means of a screw (not shown), and is electrically connected to the electric component mounting board 18 through a flexible printed circuit board 21. The contact terminal 20 is provided for the purpose of receiving power supply from the camera side for communication with the camera main body 100.

Next, the operation of the lens barrel 200 will be described. When the zoom operation ring 3 is rotated, the protrusions 4b are engaged with the rotation preventing groove 2b and thereby guided due to the operation of the cam follower 3a and the protruding cams 4a, and the female helicoid ring 4 is caused to advance or retreat along the track of the protruding cams 4a in the optical axis direction. Accordingly, the filter frame 5 and the first lens holding frame 7 advance or retreat integrally.

At the same time, due to the engagement of the lead groove portions 3b and the runners 10, the fourth lens holding frame 9, and the second lens holding frame 14 and the electromagnetic diaphragm unit 15 which are fixed to the fourth lens holding frame 9, are caused to advance or retreat in the optical axis direction along the lead groove portions 3b while guided by the rectilinear guide groove portions 2c.

At the same time, the third lens holding frame 11 is rotated by the rotation transmitting member 13 fixed to the zoom operation ring 3, and, due to the engagement of the cam followers 11a and the protruding cams 9c, the third lens holding frame 11 is caused to advance or retreat while rotating in the optical axis direction along the tracks of the protruding cams 9c between the second lens unit L2 and the fourth lens unit L4.

At this time, the third lens holding frame 11 is likely to be offset in the direction of the area corresponding to the angle θ1, which is the largest of the angles θ1 to θ3 shown in FIG. 5. In this area, however, there is provided the abutment portion where the inner peripheral surface of the recess 9d of the fourth lens holding frame 9 and the outer peripheral surface 11b of the third lens holding frame 11 are held in contact with each other, so that the third lens holding frame 11 can advance or retreat in the optical axis direction while smoothly rotating without being offset.

Further, the point of action of the rotation transmitting member 13 with respect to the third lens holding frame 11 is arranged such that the recess 9d is situated substantially in the tangential vector direction thereof, so that the third lens holding frame 11 can advance and retreat in the optical axis direction while smoothly rotating without being offset. That is, the rotation transmitting member 13 is provided in the area corresponding to the angle θ1, so that the abutment portion where the recess 9d and the outer peripheral surface 11b of the third lens holding frame 11 are held in contact with each other is substantially arranged in the line of action of the force f of the rotation transmitting member 13.

While the above-described embodiment is applied to a digital single-lens reflex camera, the present invention is also applicable, for example, to a silver-salt camera and a lens-integrated camera.

In the construction of the lens apparatus of the above-described embodiment, the first and second holding members are engaged with each other so as to be capable of relative movement by means of a plurality of engagement portions provided circumferentially at unequal intervals including a first interval and a second interval larger than the first interval. There is provided, in a portion between the engagement portions provided at the second interval in at least one of the first and second holding members, an abutment portion radially abutting the other holding member, so that it is possible to effect relative movement of the first and second holding members while restraining offset, whereby it is possible to enhance the optical properties of the lens apparatus.

Further, when a recessed portion recessed radially inwards of the second holding member is used as the abutment portion, and the actuator for driving the lens apparatus is arranged in the recessed portion, it is possible to obtain, in addition to the above-mentioned effect of restraining offset, the effect of achieving a radial reduction in the size of the lens apparatus by bringing the actuator closer to the optical axis.

This application claims priority from Japanese Patent Application No. 2004-024931 filed on Jan. 30, 2004, which is hereby incorporated by reference herein.

What is claimed is:

1. A lens apparatus comprising:
a first holding member that holds a lens unit; and
a second holding member that holds the first holding member,
wherein the first and second holding members have a plurality of engagement portions provided circumferentially at unequal intervals including a first interval and a second interval larger than the first interval, with the first and second holding members being engaged with each other so as to be capable of relative movement by means of the plurality of engagement portions, and
wherein at least one of the first and second holding members has an abutment portion radially abutting the other holding member, with the abutment portion being situated in a portion between the engagement portions provided at the second interval.

2. A lens apparatus according to claim 1, wherein, at positions corresponding to the engagement portions, a cam and a cam follower for relative driving of the first and second holding members are engaged with each other.

3. A lens apparatus according to claim 1, wherein, in an outer periphery of the second holding member, an actuator for driving the lens apparatus is arranged, and wherein the second holding member constitutes the abutment portion and has a recessed portion recessed radially inwards so as to form a space for arranging the actuator.

4. A lens apparatus according to claim 3, wherein an inner peripheral surface of the recessed portion and an outer peripheral surface of the first holding member are engaged with each other.

5. A lens apparatus according to claim 4, wherein there is provided, in a portion between the engagement portions provided at the second interval, a rotation transmitting member that rotates the first holding member.

6. A camera system comprising:
a lens apparatus as claimed in claim 1; and
a camera to which the lens apparatus can be attached.

7. A camera comprising:
a lens apparatus as claimed in claim 1; and
a photoelectric conversion element for effecting photoelectric conversion on an image of an object formed by the lens apparatus.

* * * * *